United States Patent
Klemm et al.

(10) Patent No.: US 6,895,117 B1
(45) Date of Patent: May 17, 2005

(54) RECOGNITION SYSTEM METHOD

(75) Inventors: Heinz Klemm, Blaustein (DE); Michael Küstner, Ulm (DE); Gerhard Nüssle, Blaustein (DE)

(73) Assignee: Harman Becker Automotive Systems GmbH (DE)

( * ) Notice: Subject to any disclaimer, the term of this patent is extended or adjusted under 35 U.S.C. 154(b) by 839 days.

(21) Appl. No.: 09/277,954

(22) Filed: Mar. 29, 1999

(30) Foreign Application Priority Data

Mar. 27, 1998 (DE) ......................... 198 13 605

(51) Int. Cl.[7] ............................... G06K 9/68
(52) U.S. Cl. ................................. 382/226
(58) Field of Search ................ 382/224, 226, 382/229, 187; 379/88.01; 704/246

(56) References Cited

U.S. PATENT DOCUMENTS 5,581,634 A * 12/1996 Heide ........................ 382/226
5,835,635 A * 11/1998 Nozaki et al. .............. 382/226
5,907,634 A * 5/1999 Brown et al. ............... 382/226
5,982,933 A * 11/1999 Yoshii et al. ............... 382/226

* cited by examiner

Primary Examiner—Mehrdad Dastouri
(74) Attorney, Agent, or Firm—Robert Kinberg; Jeffri A. Kaminski

(57) ABSTRACT

A method for a recognition system, for example for recognizing a location name according to a preset, spelled voice entry, in order to shorten the reaction time for a new start of a system in which data must first be transferred from a reading memory into a working memory via a connection at a low data rate. According to the method, the data are grouped in data blocks, corresponding to successive structural levels, with the data content being arranged in the manner of a branched tree structure, and with the data blocks in the hierarchical sequence of the associated structural branch levels being consecutively transferred from the reading to the working memory. The recognition has already begun, on the basis of the still-incomplete data set, after a plurality of levels is present, and is continued in real time with the transfer of further data blocks. The average processing time can be reduced further through an advantageous structuring and grouping of the data.

10 Claims, 4 Drawing Sheets

RECOGNITION SYSTEM METHOD

CROSS REFERENCE TO RELATED APPLICATION

This application claims the priority of German Patent Application No. DE 198 13 605.6 filed Mar. 27, 1998, which is incorporated herein by reference.

BACKGROUND OF THE INVENTION

The invention relates to a method of storing and transferring a data block in a character recognition system of the type having a reading memory, a working memory, an entry device and a recognition device, in which a data set of memory character sequences that is stored in the reading memory is transferred into the working memory, and the recognition device derives an association of the entered-character sequence with one of the memory character sequences from the linking of an entered-character sequence supplied via the entry device with the contents of the working memory.

A preferred application for such a recognition system is the voice entry of location names into a voice-controlled navigation system in a vehicle. The basis of the navigation system is a finite list of location names, which is present on, for example, an exchangeable data carrier and is transferred into a working memory of the recognition system via a reading device.

For a system of this type, a processing delay can occur because the data set must first be transferred into the working memory following an exchange of data carriers, the shutoff of a volatile memory as a working memory, etc. For cost reasons, the transfer is preferably not effected in an interactive manner, with selective access to selected regions of the data carrier, but, for example, as a complete data set without an interpretation of content during the transfer. At low transfer rates, as occur in data-bus systems, the transfer process can require a period of time that is perceived by the user as inconvenient, because he receives no reaction to his voice entry from the recognition system during this time.

It is therefore the object of the present invention to provide a method for storing and transmitting data blocks, in a character recognition system of the type mentioned at the outset, which reacts faster to an entry during the transfer of a data set from the reading memory into the working memory.

SUMMERY OF THE INVENTION

The above object generally is achieved according to the present invention by a method for character recognition for a character recognition system having a reading memory, a working memory, an entry device and a recognition device, with the method including the steps of: storing a data set of memory character sequences in the reading memory; transferring the character sequences from the reading memory into the working memory in a serial manner; in the recognition device, deriving an association of an entered-character sequence provided by the entry device with one of the transmitted memory character sequences by the linking of the supplied entered-character sequence with the contents of the working memory; and, wherein the stored character sequences are represented in a hierarchical branched structure having a plurality of branch levels, and, the step of transferring the character sequence data of the data set includes transmitting the partial data of successive structural branch levels one after another over time, and causing the recognition device to already receive the possible linking of a possibly-present entered-character sequence having the still-incomplete contents of the working memory before the transfer of the entire data set is complete. Various advantageous embodiments and modifications of the invention likewise are disclosed and discussed.

In the character recognition method according to the invention, after a short time, a quantity of data is already present in the form of the partial data of the first structural levels, but with the quantity of data being incomplete and constituting only a small fraction of the scope of the entire data set. However, this small quantity of data nevertheless permits a partial running of the recognition process, and thus a reaction to the user. The invention utilizes the fact that the data quantities of the partial data for the first structural levels are comparatively low.

In some applications, it can be advantageous to use not only individual symbols from a symbol library, particularly an alphanumeric symbol library, for the characters within a structural level, but to use sequences of symbols as characters, particularly symbol sequences within which the character sequences of the data set do not branch. In the case of location names from a list of names, the recognition time can therefore be reduced considerably for many location names, especially longer ones.

In an embodiment of the invention that is advantageous because of its low memory requirement, and therefore has a shorter transfer time, the partial data of a structural level are stored, in addition to the characters themselves, not explicitly by their respectively allowable subsequent characters. Rather, only a selected number of respectively allowable subsequent characters are stored. To find the subsequent characters for a particular character, all characters between the two are added, a distance within the data stream is determined as a relative address, and the characters present after this data-stream distance are evaluated for the further processing of the currently entered-character sequence. If in addition to individual symbols, symbol sequences also, can stand for the characters, then the number of symbols per character is advantageously stored as information, and the aforementioned relative addressing is effected through additional consideration of the character length.

The above-described data structuring is also advantageous for character sequences that can be represented in a branched structure for transfer and/or storage, independently of the present invention. Known, advantageous techniques of data storage, such as interleaving, redundant encoding with error correction, etc., are unaffected by this, and can typically also be used.

Preferably the method according to the invention is used in a character recognition system wherein the entry device is especially designed for voice entry, and has for this purpose a microphone, for example, and a speech-recognition device. Speech-recognition devices are known in numerous embodiments from the prior art; the relevant ones are word-recognition devices for the entry of combined-character speech and elements that recognize individual symbols for spelled voice entries.

The invention is described in detail below by way of preferred embodiments.

DETAILED DESCRIPTION OF THE
PREFERRED EMBODIMENTS

Figure 4:
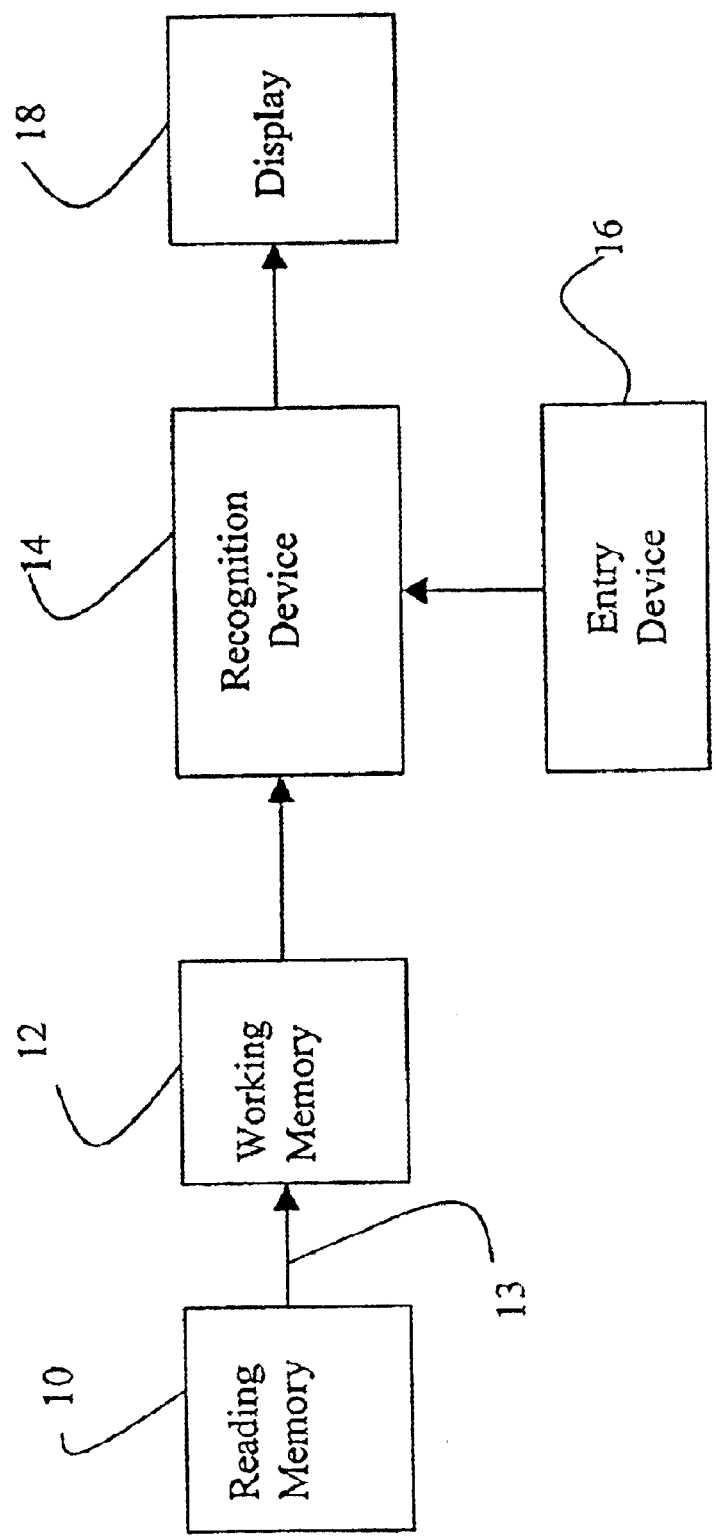
FIG. 4 is a basic bock diagram of a recognition system for carrying out the method according to the invention.

Referring first to FIG. 4, there is shown a basic recognition system including a readable memory 10 for receiving new data sets and for transferring the data sets to a working memory 12 of a character recognition system. The data set read out of the memory 10 is transferred to the working memory 12 via a serial bus 13, and thus at a relatively slow rate as explained above. The working memory 12, in turn, is addressed by a character recognition device 14 to determine if a character sequence received from an input device 16, e.g., a microphone, can be linked to a character sequence or word in the working memory 12, and thus recognize the received character sequence or word. As indicated above, normally the entire data set must be transferred from the readable memory 10 to the working memory 12 before actual character recognition can take place. The present invention shortens the time during the reading of a data set into the working memory 12 when character recognition can take place. In particular, the present invention permits character recognition to commence before the complete data set has been transferred from the readable memory 10 to the working memory 12.

Figure 1:
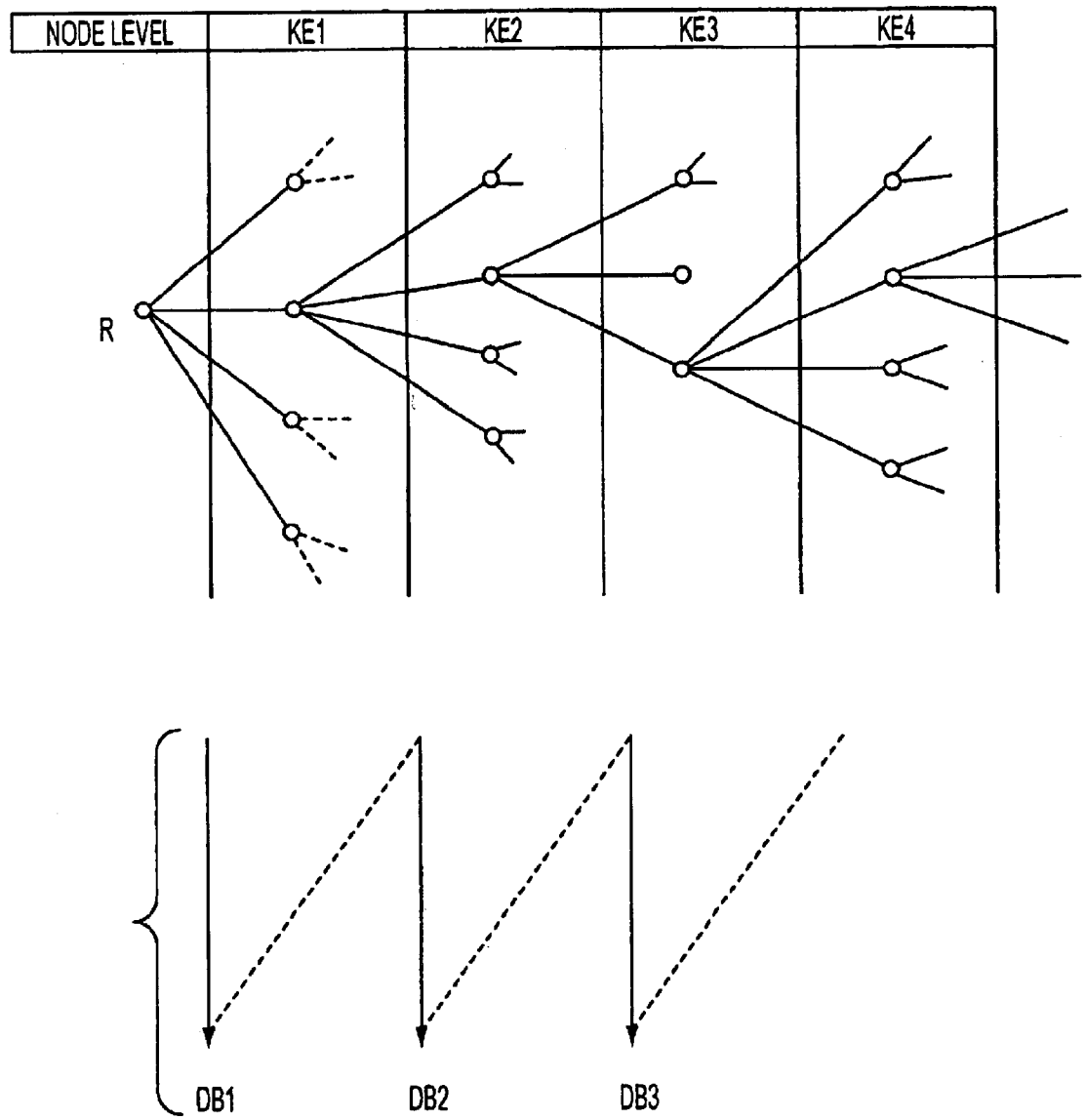
FIG. 1 shows a schematic structure of a data set.

Referring now to FIG. 1, there is shown the structure of a branched network, the initial point of which is a root node R as a neutral starting node. From this neutral starting or root node R, permissible paths lead to a plurality of nodes of a first branch level KE1. The nodes of the first level KE1 represent, for example, the first letters of respective names of places in a list of such names. The data set typically contains a plurality of permissible subsequent characters for most or all of the nodes of the first level KE1, so that numerous paths branch as they lead from the first level to the second level KE2. Further branchings also occur in the second level KE2 and in the subsequent node levels, forming an overall branched structure-referred to as a tree structure because of its appearance. The quantity of data forming the data set is arranged in the form of information about the individual nodes of the subsequent node level in such a way that the data for the nodes of the node level KE1 are grouped cohesively in a first data block B1. Following this first data block is a second data block B2, in which the data for the nodes of the node level KE2 are grouped cohesively. This grouping into data blocks and consecutive sequencing of the data blocks is continued up to the last node level, KE9 with the tree structure illustrated in FIG. 2. In an encoding of location names, the scope of the data blocks within the next level usually increases sharply from the first node level, having 29 different starting letters in the German alphabet, for maintaining a few node levels at higher levels, then falls sharply.

Figure 2:
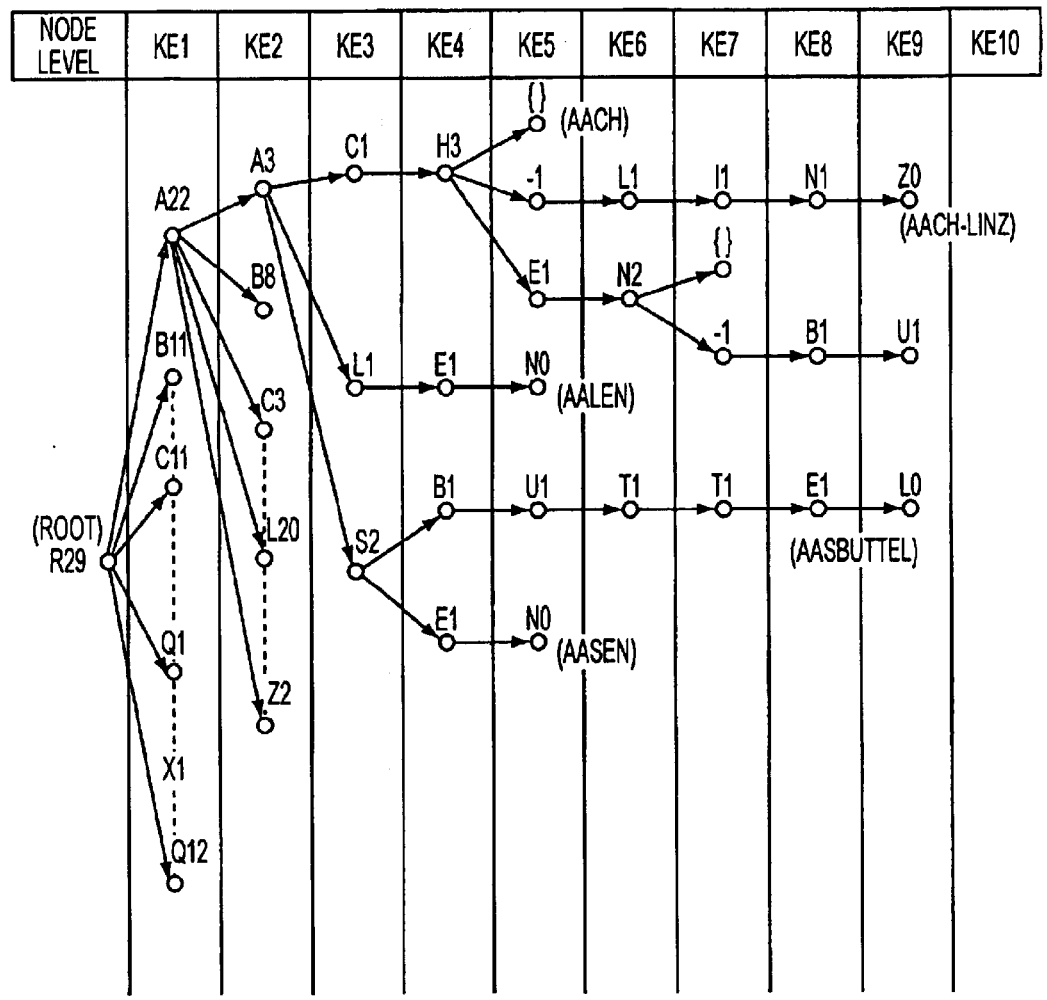
FIG. 2 shows a first embodiment of a data set structure according to the invention

In the embodiment illustrated in FIG. 2 for representing a list of location names in a tree-like branched structure, one letter from the predetermined list of symbols is provided for each character, that is, for each node of the respective node levels. The symbols are particularly the letters of the alphabet, including the three umlauted letters in the German alphabet, resulting in the mentioned 29 possible alphabet characters. The symbol library can further include special characters such as -,/ or numbers. The character associated with a node is stored as information pertaining to this node.

The number behind a respective character gives information about the number of branches leading from this particular node to permissible subsequent characters as nodes of the next level, e.g., KE2. The entry A22 in the uppermost node of the first level KE1 therefore means that this node represents the starting letter A, and that 22 different subsequent characters are permissible for this starting letter. For the other starting letters, other numbers of permissible followers are usually specified corresponding to the other nodes. Special cases would include the letter Q, which, in the German language, can only be followed by the letter U, and the letter X, for which only one location name is included in the location-name list for the assumed example. The two characters Q and X therefore have the subsequent number 1. The data block DB1 of the first data level KE1 then contains the grouped entries A22, B11, . . . to Ü12 as information about the nodes of this data level KE1.

A distance corresponding to 28 entries, i.e., B11 through Ü12, therefore results from the number of nodes in the first node layer KE1 contained in the information R29 of the root node and the position of the current character A at the first position of this node level to the beginning of the next data block for the node level KE2. Furthermore, from the entry A22 for the current node, the first 22 entries after this distance in the data stream contain the information about permissible subsequent characters. If, when a second character has been entered, the speech-recognition device 14 decides that the letter A is present, which represents a permissible follower for the letter A in the first layer in the node level KE2, the path from this node continues to the letter A in the second node level. In this node, the number 3 stands next to the letter A in the second node level KE2, which expresses that, for this node, three permissible subsequent characters exist, which are again represented by nodes in the third node level KE3. The branched structure therefore has three paths from the node A3 in the second node level that continue to nodes in the third node level KE3.

The data block DB2 of the second node level KE2 contains the node information about the subsequent nodes for the node A22 of the first node level, for example, A3, B8, . . . , Z2, which is followed by the information for eleven permissible subsequent characters in the second node level KE2 for the node B11 of the first node level KE1, for example A8 through U13. The subsequent nodes for the node C11 of the first node level KE1, etc.; then follow the second node level KE2 until all nodes of the node level KE2 form the complete data block DB2 for this node level. Following this data block DB2 is the data block DB3 containing information about the nodes of the node level KE3. The relative distance from the node A3 of the second node level KE2 to its permissible followers in the data block DB3 results from the sum of the entries between them, which can be derived from the information present to that point, such that the node A3 of the second node level constitutes the first position within the permissible followers of the node A22 of the first node level, and 21 subsequent nodes must therefore be skipped to A22.

All subsequent nodes for the nodes of the first node level KE2 following A22 qualify as entries to be skipped, and contribute to the distance to the subsequent nodes for A3; their number results in cumulative fashion from the numbers (B)11, (C)11, . . . , (Ü)12 provided for the letters. The three entries occurring in the data stream after this distance are treated as possible followers for the node A3 of the second level, and therefore in total for the character sequence AA. Within the permissible followers C, L and S, the speech-recognition device decides whether the letter S is present as the third character of the entered-character sequence, and the path is continued from the subsequent node S, for which two subsequent characters should be permissible in the given scenario, and is therefore present as a complete entry S2. The entries—in the example, H3 and E1—opposite one another in the node level KE4, and the subsequent entries of the node level KE3, constitute part of the distance to the two permissible subsequent nodes in the level KE4 for this node S2 in the level KE3.

Due to the continuation by the speech-recognition device 14 within the branched structure, in the ninth node level a node L is attained, which is characterized as the end of a name in that the available number of permissible followers equals zero. The entered location name is therefore complete. To this end, in the example, the partial data had to be transferred from new node levels from the reading memory 10 into the working memory 12, so the name is completed fairly late. Because the recognition device 14 starts early, and the path is followed in steps through the branch network, the user can be signaled that his voice entry is being processed before the loading of a few levels, for example four levels, through the construction of a display 16 of the first associated characters of the entered-character sequence to one of the stored character sequences. Moreover, the user can interrupt further processing upon recognition of a false association of a given character, and start a new entry.

Figure 3:
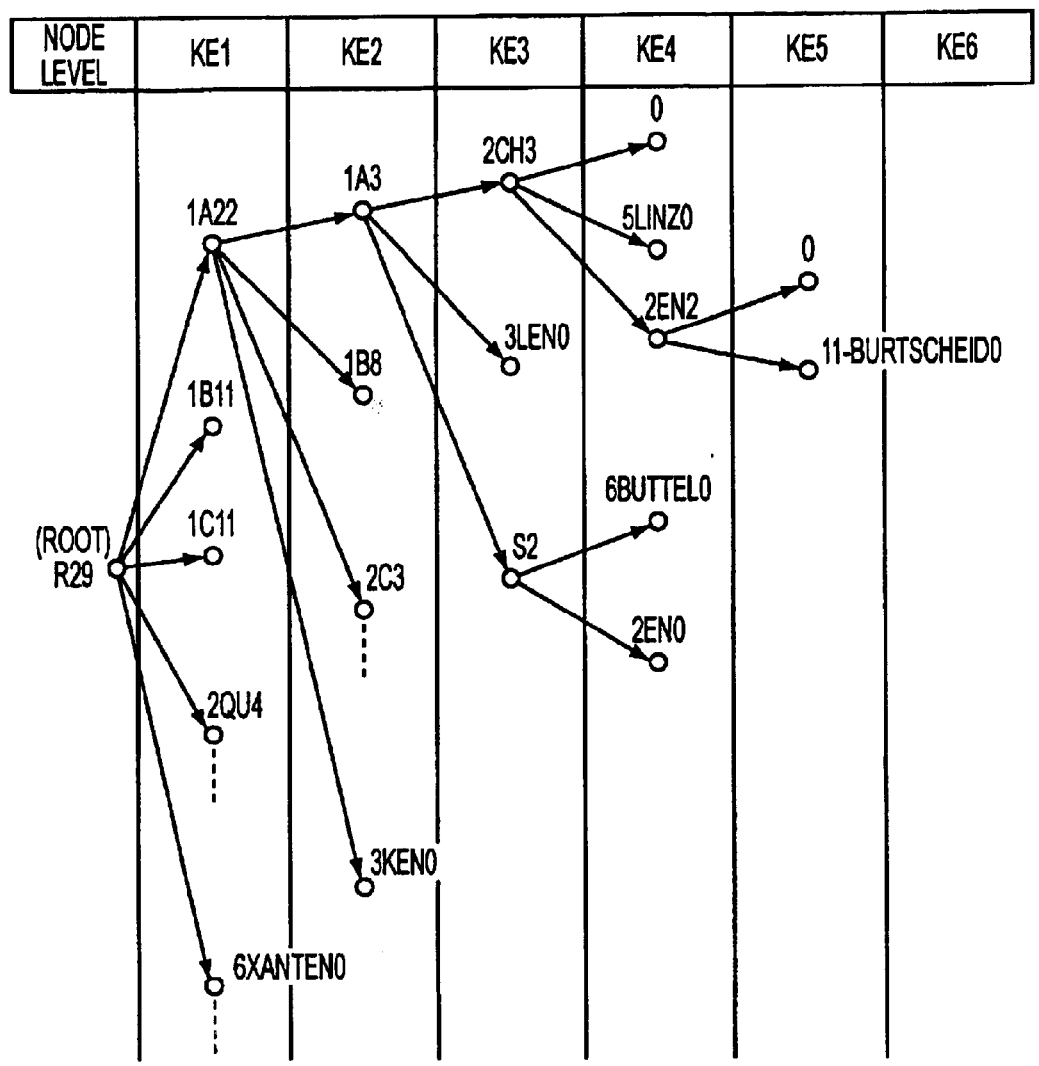
FIG. 3 shows a second embodiment of a data set structure according to the invention.

The data structure shown illustrated in the embodiment shown in FIG. 3 basically differs from the embodiment shown in FIG. 2 in that not only a single symbol, but additionally a sequence of symbols, from the symbol library can be contained as a character in a node of a node level. This grouping of several sequential symbols in a single node is especially advantageous if a branch network constructed between two or more consecutive nodes in different levels, as detailed in FIG. 2, contains no branches. This is the case for the location name AASBÜTTEL for the character sequence BÜTTEL, whose path is defined upon attainment of the node B1 in the fourth node level of FIG. 2 up to the letter L, and hence, in this example, until the end of the word. Because in the example of FIG. 2, the node levels 5 through 9 offer no more path decisions, in the embodiment according to FIG. 3, all characters of this partial sequence Büttel are already grouped in a single node of the fourth node level KE4. When the Büttel node of the fourth node level is reached, to end the procedure, it can be checked whether the entire character sequence AASBÜTTEL can be assumed for an association of the entered-character sequence based on cumulative probabilities of the speech-recognition device 14 or comparable criteria. A similar situation arises for the location name AALEN in the illustrated branch network of FIG. 3, in which the symbol sequence LEN, which is distributed onto three node levels KE3 through KE5 in FIG. 2, can be grouped in a single node LEN of the node level KE3. The symbol sequences that can be grouped are not necessarily at the end of the location name, but can also be intermediate segments in central parts of names, or be at the beginning. Typical symbol sequences that can frequently be grouped because of an unambiguous, detailed path, are CH or CK; the letters QU must appear together as a symbol sequence, and for a location name beginning with the letter X, in the example of the German language there is only one, XANTEN, which can already be completely handled and recognized in the first node level KE1.

For effective storage, transfer and processing of such a modified branch network with the symbol sequences being permitted in a network node, the entries for the individual nodes can advantageously be expanded by a further number that indicates the number of symbols within this node. This number precedes the entry already described in detail in conjunction with FIG. 2 by one node. The entry 1A22 at a node means that this node contains a symbol, this symbol is the letter A, and 22 permissible subsequent nodes are present for this node in the next node level in the hierarchy. In this representation, a node entry 2QU4 means that the node contains two symbols, these symbols are Q and U consecutively, and four permissible subsequent nodes for this node exist in the next node level KE4. The entry 6XANTEN0 means that a six-character symbol sequence XANTEN is associated with the node, and the name is already complete and has no more permissible followers.

To determine the relative position of the group of entries of permissible followers, in a modification of the determination in the example of FIG. 2, the length of the entries at the respective intermediate nodes must be considered.

Insofar as the location-name recognition device cannot readily determine the number of data blocks that have already been transferred from the information about the individual nodes, these data-block numbers can be disclosed with the other information. If the number of transferred blocks is known, the recognition of the location name can be continued in real time with the transfer of the data from the reading memory 10. For example, the partial data from four node levels KE1 through KE4 can be transferred from the reading memory 10 to the working memory 12 in a relatively short time. Based on this, the recognition of an entered and intermediately stored entered-character sequence can begin. As soon as the partial data of the next node level have been transferred, the recognition device can advance one step until the entire name has been recognized. Whereas in a data structure according to FIG. 2, long location names require the passage through numerous node levels, and thus the transfer of large quantities of data, in the data structure of the type outlined in FIG. 3, a significant reduction in the recognition time is anticipated for many entries into the name list. For other scenarios, the data structure outlined in FIG. 2 can be of greater advantage.

The invention is not limited to the described embodiments, but can be modified in numerous ways within the scope of the capability of one skilled in the art, and is especially advantageously applicable to other scenarios than the recognition of location names from a list of names.

What is claimed is:

1. A method for character recognition for a character recognition system having a reading memory, a working memory, an entry device and a recognition device, with said method including the steps of: storing a data set of memory character sequences in the reading memory; transferring the character sequences from the reading memory into the working memory in a serial manner; in the recognition device, deriving an association of an entered-character sequence provided by the entry device with one of the transmitted memory character sequences by the linking of the supplied entered-character sequence with the contents of the working memory; and, wherein the stored character sequences are represented in a hierarchical branched structure having a plurality of branch levels, and, said step of transferring the character sequence data of the data set includes transmitting the partial data of successive structural branch levels one after another over time, and causing the recognition device to already receive the possible linking of a possibly-present entered-character sequence having the still-incomplete contents of the working memory before the transfer of the entire data set is complete.

2. The method defined in claim 1, wherein the partial data of a structural branch level are arranged as a cohesive data block, and the data blocks are arranged in a hierarchy of successive structural levels as a linear data sequence in the reading memory.

3. The method defined in claim 2, wherein the reading memory is a portable data carrier.

4. The method defined in claim 1, wherein the reading memory is a portable data carrier.

5. The method defined in claim 1, wherein the characters of the stored character sequences are at least one of individual symbols and sequences of symbols from a finite list of symbols.

6. The method defined in claim 1, wherein the character sequences comprise alphanumeric symbols.

7. The method defined in claim 1, wherein, for the characters of a structural level, the number of permissible subsequent characters of the next structural level is stored and transferred.

8. The method defined in claim 5, wherein, for characters comprising a plurality of symbols, the number of symbols of the respective character is stored and transferred.

9. The method defined in claim 8, wherein the entry device is a device for receiving and interpreting voices.

10. The method defined in claim 1, wherein the entry device contains an intermediate memory for the entered-character sequence.

\* \* \* \* \*